United States Patent
Lewis et al.

(10) Patent No.: US 8,403,223 B2
(45) Date of Patent: Mar. 26, 2013

(54) INVISIBLE-FLUORESCENT IDENTIFICATION TAGS FOR MATERIALS

(75) Inventors: Linda A. Lewis, Andersonville, TN (US); Glenn O. Allgood, Powell, TN (US); Robert W. Smithwick, III, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 98 days.

(21) Appl. No.: 13/026,016

(22) Filed: Feb. 11, 2011

(65) Prior Publication Data

US 2012/0205449 A1   Aug. 16, 2012

(51) Int. Cl.
*G06K 7/10*   (2006.01)

(52) U.S. Cl. ....... 235/468; 252/301.16; 427/7; 427/466; 250/271

(58) Field of Classification Search .......... 235/468; 252/301.16; 427/7, 466; 250/271
See application file for complete search history.

(56) References Cited

U.S. PATENT DOCUMENTS

| | | | |
|---|---|---|---|
| 4,642,526 A * | 2/1987 | Hopkins | 315/244 |
| 5,336,714 A | 8/1994 | Krutak et al. | |
| 5,592,561 A | 1/1997 | Moore | |
| 5,939,468 A | 8/1999 | Siddiqui | |
| 5,990,197 A | 11/1999 | Escano et al. | |
| 6,149,719 A | 11/2000 | Houle | |
| 6,499,513 B1 | 12/2002 | Couch | |
| 6,513,921 B1 | 2/2003 | Houle | |
| 6,576,155 B1 | 6/2003 | Barbera-Guillem | |
| 6,861,012 B2 * | 3/2005 | Gardner et al. | 252/301.36 |
| 6,899,752 B2 | 5/2005 | Sekioka et al. | |
| 7,147,801 B2 | 12/2006 | Kozee et al. | |
| 2003/0177941 A1 * | 9/2003 | Barbera-Guillem | 106/31.15 |
| 2004/0037947 A1 * | 2/2004 | Patel et al. | 427/7 |
| 2008/0161661 A1 * | 7/2008 | Gizewski | 600/306 |
| 2009/0045360 A1 | 2/2009 | Wosnick et al. | |
| 2010/0248245 A1 * | 9/2010 | Ying et al. | 435/6 |

FOREIGN PATENT DOCUMENTS

| | | |
|---|---|---|
| CN | 2265086 Y | 10/1997 |
| ES | 2 147 473 A1 | 9/2000 |
| JP | 9-234982 A | 9/1997 |
| JP | 10-251584 A | 9/1998 |
| JP | 2003251907 A | 9/2003 |
| WO | WO2009139631 A1 | 11/2009 |

OTHER PUBLICATIONS

C. Passariello, "Holograms Tell Fake From Fendi as Knock-Offs Get Better, Makers of Luxury Goods Reach for High-Tech Defense" The Wall Street Journal, Feb. 22, 2006.
I. Ziljak et al., "Design of Security Graphics with Infrared Colours," Science & Technology, Apr. 2008, pp. 24-31.

* cited by examiner

*Primary Examiner* — Allyson Trail
(74) *Attorney, Agent, or Firm* — Pauley Petersen & Erikson

(57) ABSTRACT

A taggant composition including a taggant material that is invisible in light of the visible spectrum and fluoresces under a non-visible excitation energy, a binder, and a solvent in which the taggant material and the binder are dissolved. The taggant composition can be printed or otherwise applied to a material such as fabric to provide a detectable and identifiable indicium. A method and apparatus for detecting and decoding the taggant indicium are also provided.

18 Claims, 3 Drawing Sheets

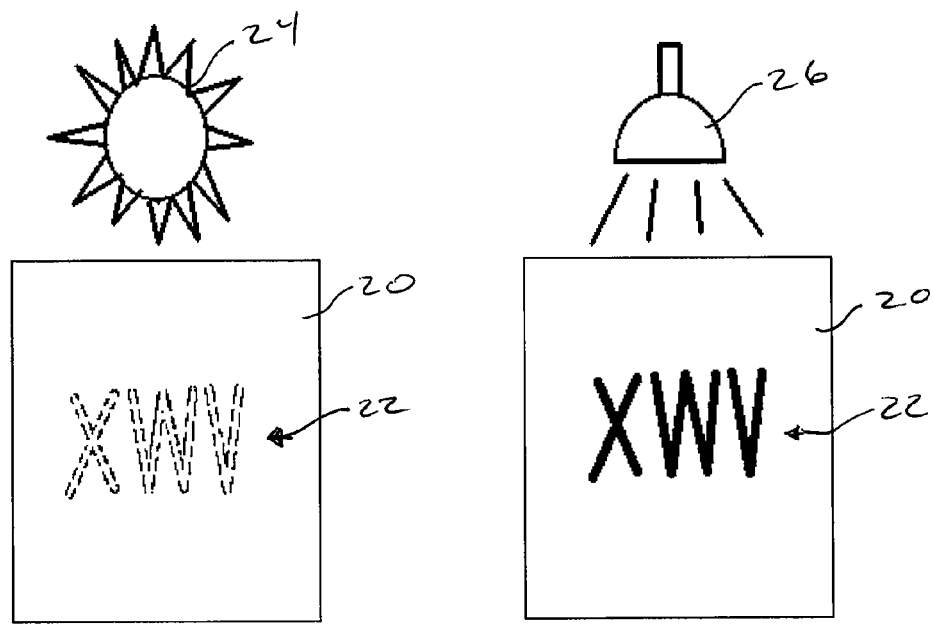
FIG. 1
FIG. 2
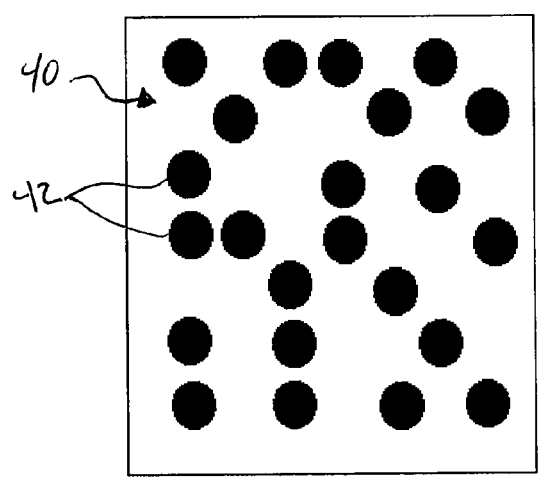
FIG. 3

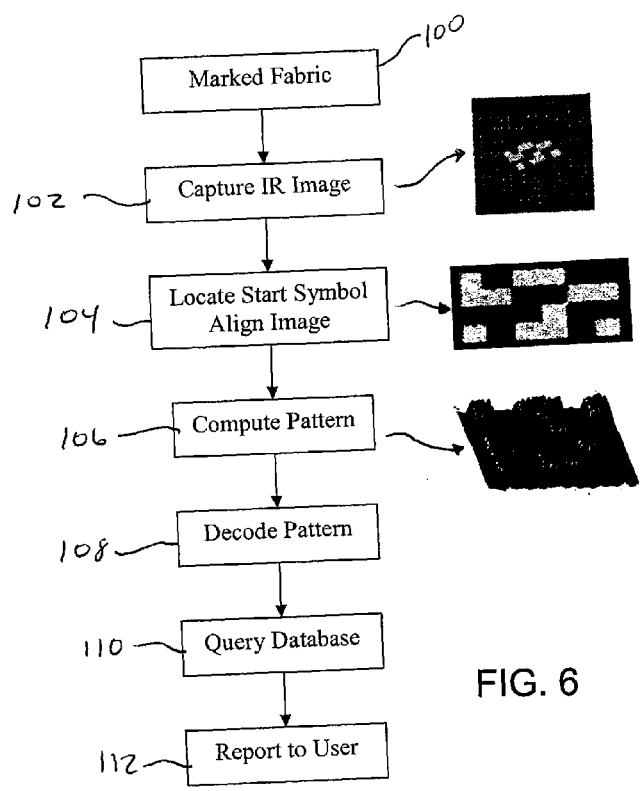
FIG. 6
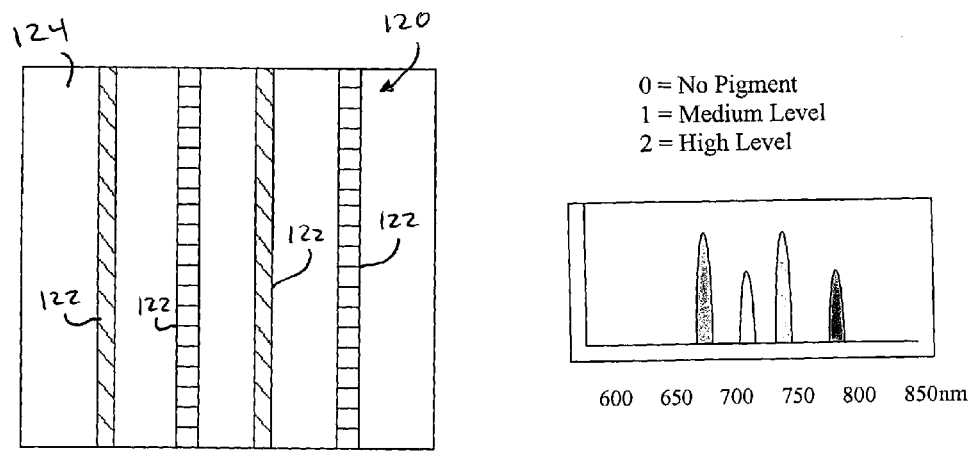
FIG. 7
0 = No Pigment
1 = Medium Level
2 = High Level
FIG. 8

INVISIBLE-FLUORESCENT IDENTIFICATION TAGS FOR MATERIALS

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to identification markings for preventing incorrect shipping, counterfeiting, use of non-specified materials, as well as support identification of U.S. materials or goods, quality control, and/or remediation efforts.

BACKGROUND OF THE INVENTION

The U.S. Department of Commerce has stated the need to be able to add a tag to identify the point of origin of textiles (raw materials, yarn, fabric, clothing, security documents, currency, etc.), detail manufacturing information, and also for tracking goods. This identification would help to prevent counterfeiting, to enforce international quotas, to collect applicable import duties, to promote manufacturing quality control and e-commerce, and to identify textiles that have been discarded. A capability such as this could also be used in reclamation and waste remediation. Such an identification method is desirably inexpensive to apply, easy to decode/encode, information-rich, non-toxic, non-obvious, long-lasting, applicable to rough-textured fabric, and difficult to duplicate.

Two technologies have attempted to address the textile need, but were found to fall short on the full solution identified by the textile industry. One uses biomarkers in which a specific DNA is applied to fabric, thereby allowing this marker to subsequently be detected in a highly specific manner using some already developed DNA-detecting technology. The other uses nanobarcodes in which different metals are electrodeposited into tiny channels of a material and then recovered to yield small striped rods. A reader detects mixtures of these metallic nanobarcodes.

There is a continuing need for identification tagging systems for materials, such as textiles.

SUMMARY OF THE INVENTION

The current invention provides identification markings for preventing incorrect shipping, counterfeiting, use of non-specified materials, as well as support identification of materials or goods originating in the U.S.A., quality control, remediation efforts, and/or quality failure claims.

The invention utilizes an invisible-fluorescent material, such as an ink or paint, which, after application to a surface, is invisible to the human eye under natural or room lighting, but fluoresce at a characteristic wavelength upon illumination by an appropriate light source. The invention includes invisible, fluorescent solvent- and water-based taggant materials for use in identifying, without limitation, raw materials, textiles, apparels, garments, and other security or consumer products or parts.

When applied to textile and other consumer products as a sequence of marks, semiotic, alphanumeric, trademark, or geometric symbols, the taggant composition of this invention may be activated by non-visible radiation, such as ultraviolet, infrared (IR), or near-infrared (near-IR) light, with subsequent light emission being detected and decoded by machine vision. Alternatively, the taggant composition may be applied to textiles, apparels, garments, and other consumer products in the form of a readable pattern, such as a barcode, which could best be read under IR light excitation by machine to decode specific manufacturer information encoded within the barcode or for the purpose of tracking goods or supporting reclamation. The invisible fluorescent taggant material(s) within the taggant composition may comprise organic dyes, pigments, and/or nanoparticles.

Taggant compositions of preferred embodiments of this invention are capable of invisibly tagging raw products, textiles, and other security and consumer products or parts using a formulation that is capable of persisting through the rigors of industrial processing, including scouring, heavy bleaching, mercerization, and/or dyeing, while remaining invisible except through use of a special reading apparatus.

This technology is able to apply invisible, unnoticed, durable, non-toxic, and difficult to duplicate marks, symbols, and or barcodes to textiles for the purpose of, without limitation, brand and counterfeit protection, customs inspection on U.S. goods, and industrial quality control.

Embodiments of this invention include a taggant composition (e.g., an ink or dye) including at least one taggant material, such as: a dye, e.g., silicon 2,3-naphthalocyanine bis(trihexylsilyloxide), and/or other versions of the metal complexed naphthalocyanine family, and/or other cyanine, naphthocyanine or phthalocyanine dyes; a glass encapsulated nanoparticle, e.g., CdTe, PbS, PbSe, InAs; and/or a phosphor, e.g., YAG:Nd, Al2O3:Nd, and/or various other phosphor based IR active nanoparticles. The taggant material is desirably characterized by invisibility in natural or conventional indoor lighting, and narrow band infrared fluorescence in a distinct region under the influence of a preselected excitation energy. The taggant composition further includes a binder system including a binder, e.g., polystyrene, poly(styrene-co-allyl alcohol), poly(vinyl butyral), poly(ethyleneimine), poly(hydroxyethyl methacrylate), and/or poly(vinylpyrrolidone) for binding the taggant material to a material substrate. The taggant composition also includes a solvent, e.g., MEK, MIBK, chloroform, DMSO, acetone, methanol, ethanol, and/or ethyl acetate, for dissolving the taggant and/or the binder, and acting as a vehicle.

The invention further includes a method of tagging a material substrate including the steps of: providing at least one taggant composition and applying the at least one taggant composition to a material to be tagged, optionally via an inkjet print head or stamp pad or the like to produce a desired barcode or other readable pattern. Optionally, a plurality of different taggant compositions can be used to exponentially increase the complexity of the applied taggant indicium.

A tagged article of this invention can include a material substrate, e.g., textile, woven fabric, nonwoven fabric, thread, fibers, cardboard, metal, concrete, polymer, plastic, leather, wood, and paper (including currency, certificates, licenses, identification cards, and passports), having disposed thereon at least one taggant formed using one or more taggant composition. The taggant can provide one or more of the following indicia: a detectable presence of at least one specific wavelength of fluoresced infrared light; a quantifiable concentration of at least one specific wavelength of fluoresced infrared light; and/or a readable pattern (e.g., barcodes, including 2-dimensional barcodes, letters, numbers, dot matrix, symbols) on the material.

The invention also includes an apparatus for detecting and reading a tagged article. The apparatus includes an emitter or other means for emitting the preselected excitation energy in order to induce the taggant to undergo narrow band fluorescence in a distinct region, and a detector or other means for detecting (and optionally quantifying) the narrow band fluorescence in a distinct region. The apparatus optionally includes a means for reading the readable pattern (e.g., via optical character recognition), a means for processing and displaying resulting data, and/or a means for reading and interpreting a barcode, for example, as a numerical value.

BRIEF DESCRIPTION OF THE DRAWINGS

The above-mentioned and other features and objects of this invention will be better understood from the following detailed description taken in conjunction with the drawings wherein:

FIGS. 1 and 2 show a material substrate including a taggant according to one embodiment of this invention, in visible light (FIG. 1) and non-visible light (FIG. 2);

FIG. 3 shows an exemplary readable pattern;

FIG. 6 is a flow diagram illustrating a method of one embodiment of this invention;

FIG. 7 shows fabric including thread markers according to one embodiment of this invention; and FIG. 8 shows a representative illustration of a flourescent taggant reading according to one embodiment of this invention.

DETAILED DESCRIPTION OF THE INVENTION

Figure 4:
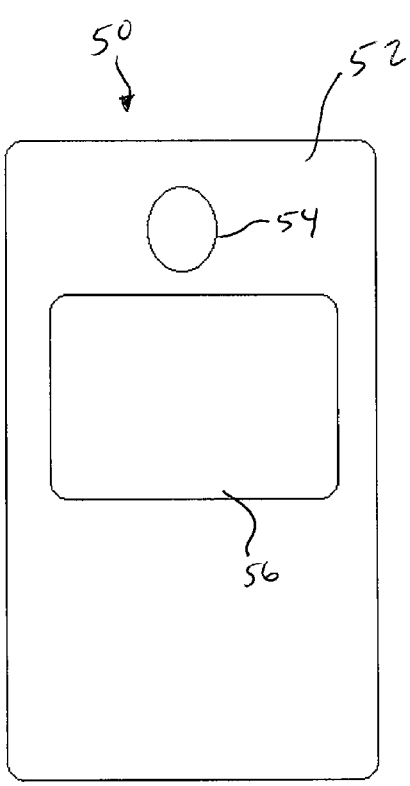
FIGS. 4 and 5 show a device for reading a taggant of this invention.

This invention provides a taggant composition for use in marking articles with an identifier for preventing incorrect shipping, counterfeiting, use of non-specified materials, as well as support identification of U.S. materials or goods, quality control, and/or remediation efforts.

The taggant composition of this invention includes a taggant material that is invisible in light of the visible spectrum and fluoresces or otherwise becomes detectable under a non-visible excitation energy. FIGS. 1 and 2 illustrate the taggant composition and material according to this invention. In FIGS. 1 and 2, a material 20 is printed, stamped, or otherwise marked with taggant composition to form a code 22 of "XWV". In FIG. 1, under visible light (represented by the sun 24), the taggant material, and thus code 22, is invisible to the human eye (illustrated by the "phantom" code 22). However, when the article 20 is radiated with non-visible light, such as from infrared light source 26 in FIG. 2, the code 22 fluoresces and thus becomes detectable to the human eye and/or a detector apparatus.

The taggant material of this invention can include various and alternative materials that are invisible under visible light but are otherwise detectable under non-visible radiation, such as infrared, near-infrared, and/or ultraviolet radiation. Examples of suitable taggant materials include dyes, nanoparticles, phosphors, and/or combinations thereof. Examples of preferred taggant material dyes include cyanine compounds, such as, without limitation, silicon 2,3-naphthalocyanine bis(trihexylsilyloxide), and other versions of the metal complexed naphthalocyanine family, or other cyanine, naphthocyanine or phthalocyanine dyes. Examples of preferred taggant material nanoparticles include glass encapsulated nanoparticles such as, without limitation, cadmium telluride (CdTe), lead sulfide (PbS), lead selenide (PbSe), indium arsenide (InAs), and combinations thereof. Examples of preferred taggant material phosphors include neodymium-doped yttrium aluminium garnet (YAG:Nd), neodymium-doped aluminum oxide (Al2O3:Nd), and/or other phosphor based IR active nanoparticles.

The taggant composition according to one embodiment of this invention further includes a binder and a solvent. The taggant material and the binder are dissolved in the solvent for application to an article. The binder can improve adhesion to the article, maintaining the taggant composition during industrial processing, such as for fabrics including scouring, heavy bleaching, mercerization, and/or dyeing. Exemplary binders include, without limitation, polymers such as polystyrene, poly(styrene-co-allyl alcohol), poly(vinyl butyral), poly(ethyleneimine), poly(hydroxyethyl methacrylate), poly(vinylpyrrolidone), and combinations thereof. The solvent is any component suitable for rendering the taggant composition ready for application, such as through printing (e.g., screen or electrostatic printing), stamping or other marking processes. The solvent can be chosen according to need and other components of the taggant composition. Exemplary solvents include methyl ethyl ketone, methyl isobutyl ketone, chloroform, dimethyl sulfoxide, acetone, methanol, ethanol, ethyl acetate, or combinations thereof.

The invention further includes a method of applying the taggant composition to a material substrate to be tagged to form one or more indicium. Any suitable method can be used in applying the taggant composition, such as inkjet printing and/or stamping, to form a taggant on a substrate for or of an article. Various articles can be tagged according to this invention, including, without limitation, raw or processed textile materials, greige material, woven fabric, nonwoven fabric, thread, fibers, cardboard, metal, concrete, polymer, plastic, leather, wood, and paper apparel, garments, labels, security tags and documents (including currency, certificates, licenses, identification cards, and passports), and a variety of consumer goods including both natural and man-made products.

The indicium can take any form for any purpose, such as for preventing incorrect shipping, counterfeiting, use of non-specified materials, as well as support identification of U.S. materials or goods, quality control, and/or remediation efforts. The indicium can take the form of one or more marks, alphanumerics, symbols, and/or data arrays. An example of an alphanumeric indicium is shown in FIGS. 1 and 2. Multiple alphanumeric characters, such as shown in FIGS. 1 and 2 may be used in combination to generate a unique marker that may point to an entry in a database. Choosing from a variety of thirty characters and using five character positions, for example, may yield 24.3 million combinations. Specific positions could represent manufacturer and product run number. Using two or more different taggant compositions can further increase the complexity of the indicium.

In one embodiment of this invention, the indicium is or includes a readable pattern. One such readable pattern is a barcode tag. The barcode tag can be a simple data-matrix based barcode produced using a one-color invisible-fluorescent ink, or can be made more complex using additional markings and/or colors. The simple barcode approach has an advantage of utilizing a single-ink system, a computer-controlled ink jet or related printing (spray-jet) application method, and a detection/image capture system able to capture the barcode image and converting it into a single number for the purpose of providing a pointer into a computer database.

In one embodiment of this invention, the readable pattern is a patterned array, such as of dots, squares, or other shapes or symbols. FIG. 3 illustrates an exemplary array 40 formed of a 7×7 array of dots 42. While any suitable array pattern can be used, the use of a 7×7 array, such as of dots 42 partially inked with an invisible, near-IR fluorescent ink, can provide particular benefits for ink-jet printing. A high resolution ink-jet printer is relatively expensive and relatively slow compared to a low-resolution ink-jet printer. There are low-resolution ink jet printers with 7 nozzles that create one spot from each droplet.

In one embodiment of this invention, particular dots 42, such as one or more corner dots 44 can be used to determine whether the reader is detecting the image or its mirror image. By inking or not inking the remaining dots of the array, there are numerous different combinations that could be decoded to give a number. That number could point, for example, to a single line within a data base that could hold relevant information about the origin of the items marked with that readable pattern. To manage the large number of different possible barcodes, it is convenient to index to a number by computer, then create the image file (e.g., bitmap) for the barcode that corresponds to that number, then print that barcode with an ink jet printer or something similar.

Multiple printer heads can be run by a single controller; whereas multiple controllers can be run by a single computer. At low resolution, readable patterns such as barcodes can be printed at speeds up to 12 feet per second. An exemplary strategy for applying barcodes includes having a 72-inch fabric frame with 12 fixed ink jet printheads. As the fabric moves along this frame, a given barcode would be printed in a square array of barcodes on 6-inch centers. In this fashion, 36 of the same barcodes would be printed per square yard of fabric. Printing barcodes on 6-inch centers is just one example of how to add the taggant of this invention, and the choice of the spacing (and the corresponding number of barcodes per square yard of fabric) will depend upon the final use of the taggants and the costs of printing those taggants.

Figure 5:
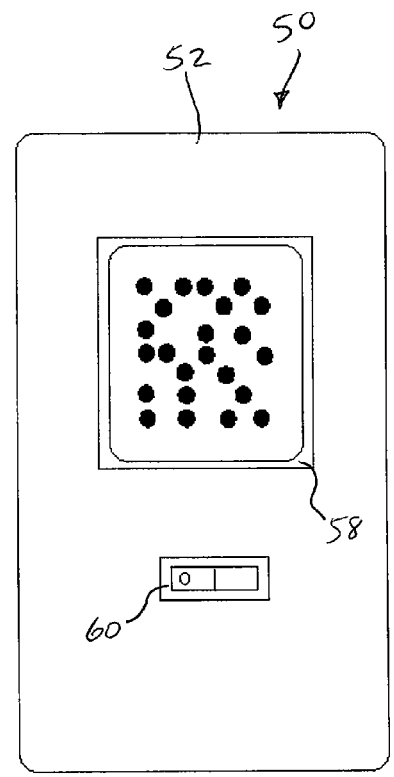

The invention further includes a detection system capable of exciting the taggant, and subsequently detecting, storing, and decoding the indicium of the taggant. The detection system desirably includes an apparatus for reading the taggant. FIGS. 4 and 5 illustrate an exemplary device 50 for reading the taggant according to one embodiment of this invention. The device 50 includes a housing 52 including an emitter 54 capable of emitting the excitation energy to induce the taggant material to fluoresce. The device further includes a detector 56 that detects a fluorescing taggant material upon excitation by the emitted energy from emitter 54. Internally, the device 50 includes a processing chip or other data processor coupled with a recordable medium including software for a pattern recognition module for detecting and/or decoding the indicium, and a display module for displaying the indicium or the corresponding information to a user. FIG. 5 illustrates the opposing side of the device 50, including a user interface screen 58 and an activation button 60 for activating the device 50 to read and/or decode a taggant.

FIG. 6 is a flow diagram illustrating the operation of the detection device 50 according to one embodiment of this invention. A fabric or other material substrate that is marked with the taggant composition according to this invention is provided to a detection system in box 100. The detection system, such as discussed above, captures an image of the taggant using infrared or similar light in step 102. If necessary, the detection system locates a start symbol that allows the detection system to properly align the image for decoding purposes in step 104. In step 106, the detection system computes the pattern, such as including generating the illustrated infrared imaging plot, and in step 108 the pattern is decoded. The decoded pattern is then used to query the code against a stored database in step 110 to determine the stored information corresponding to the taggant code. In step 112, the stored information is reported to a user, either through the detection system (e.g., the handheld detector) or through an associated user interface (e.g., integral to or remote from the detection system).

The device 50 shown in FIGS. 4 and 5 is embodied as a hand-held detection device 50. As will be appreciated by those skilled in the art following the teachings herein provided, various and alternative sizes, shapes, amounts and configurations are available for the detection system and/or any detection 50 thereof. For example, the detection system can be embodied as an automated system including a transport device for moving the articles past one or more integrated detection devices. The detection systems of this invention can also be wired or wirelessly connected to a data processor including a database for storing the meaning of the readable taggants and/or the taggants actually read during use of the system.

In one embodiment of this invention, the detection system and/or the detector includes a spectrometer. The spectrometer can be used by the detector to detect, analyze and interpret a taggant that provides more than one fluorescence wavelength. A corresponding taggant composition can include more than one taggant material to provide the more than one fluorescence wavelength. In one embodiment, the taggant composition includes at least three different taggant materials that in combination provides an indicium comprising a characteristic fluorescence wavelength spectrum.

The invention further includes a marker system that incorporates more than one fluorescent component contained within a given taggant indicium. As shown in FIG. 7, the marker system 120 can include, for example, one or more marked threads 122 that run through a fabric 124. A single mark of a given excitation/emission wavelength may be employed as a "yes/no" indicator for material substrates. Additionally, the taggant composition can include two, three, four, or more different fluorescent dyes, pigments, and/or nanoparticles that are invisible in natural or room light, fluorescent when appropriately excited, and desirably emit a light in a distinct region with a narrow emission band. In FIG. 7, each of four individual marked threads is marked with one of two different taggant materials (illustrated by cross-hatching), however two, three, four, or more taggant materials having different wavelengths can alternatively be applied to one, two, or three threads.

Multiple levels or concentrations of each taggant material at a characteristic wavelength can also be added to the taggant composition formulations, for example: 0=No Pigment; 1=Medium Level; and 2=High Level. The marker information can be detected and decoded, such as representatively illustrated in FIG. 8, through the use of a small spectrometer incorporated into the detection system or a reader designed to illuminate the mark and detect distinct bands using band-pass filters and a photo-detection system. In addition, the marker system may be incorporated into the other indicium described above for the purpose of adding additional complexity to the code for the purpose of deterring counterfeit.

Thus the invention provides a taggant composition that can be used to form a taggant indicium on a material substrate that is invisible in visible light and detectable in a non-visible light. The taggant composition can be used on various material substrates to identify, for example, the type or origin of the material.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A taggant composition, comprising:
   a first and a second taggant material that are each invisible in light of the visible spectrum and fluoresce under a non-visible excitation energy;
   as binder; and
   a solvent, wherein the first and second taggant materials and the binder are dissolved in the solvent.

2. The taggant composition of claim 1 wherein the first and second taggant materials each comprise at least one of a dye, nanoparticle, or phosphor.

3. The taggant composition of claim 1 wherein at least one of the first and second taggant materials comprises a cyanine compound.

4. The taggant composition of claim 1 wherein at least one of the first and second taggant materials fluoresces in infrared or near-infrared light.

5. The taggant composition of claim 1 wherein the binder comprises a polymer selected from the group consisting of polystyrene, poly(styrene-co-allyl alcohol), poly(vinyl butyral), poly(ethyleneimine), poly(hydroxyethyl methacrylate), poly(vinylpyrrolidone), and combinations thereof.

6. The taggant composition of claim 1 wherein the solvent comprises methyl ethyl ketone, methyl isobutyl ketone, chloroform, dimethyl sulfoxide, acetone, methanol, ethanol, ethyl acetate, or combinations thereof.

7. A method of tagging a material using the taggant composition of claim 1, the method comprising applying the taggant composition to a material to be tagged to form an indicium.

8. The method of claim 7 further comprising applying the taggant composition via at least one of an ink-jet printer or a stamp pad.

9. A taggant article comprising a material substrate including the taggant composition of claim 1 to form a taggant on the material substrate.

10. The tagged article of claim 9 wherein the taggant provides an indicium comprising at least one of:
    a detectable presence of at least one wavelength of fluoresced non-visible light;
    a quantifiable concentration of at least one specific wavelength of fluoresced non-visible light; or
    a readable pattern on the material substrate.

11. The tagged article of claim 9 wherein the taggant provides an indicium comprising a readable pattern comprising a barcode.

12. The tagged article of claim 9 wherein the taggant provides an indicium comprising a readable pattern comprising an array pattern.

13. The tagged article of claim 9 wherein the taggant composition comprises a least three different taggant materials that in combination provide an indicium comprising a characteristic fluorescence wavelength spectrum.

14. An apparatus for reading the tagged article of claim 9 the apparatus comprising:
    an emitter capable of emitting the excitation energy to induce the taggant material to fluoresce; and
    a detector in combination with the emitter, wherein the detector detects the fluorescing taggant material.

15. The apparatus of claim 14 wherein the detector comprises a pattern recognition module and a display module in combination with a user interface.

16. The apparatus of claim 14 wherein the detector comprises a spectrometer.

17. A method of tagging a material, the method comprising:
    applying first and second taggant compositions to a material to be tagged to form an indicium, said first and second taggant compositions each comprising:
        taggant material that is invisible in light of the visible spectrum and fluoresces under a non-visible excitation energy;
        a binder; and
        solvent, wherein the taggant material and the binder are dissolved in the solvent.

18. A taggant composition, comprising:
    a taggant material that is invisible in light of the visible spectrum and fluoresces under a non-visible excitation energy, the taggant material comprising a cyanine compound;
    a binder; and
    a solvent, wherein the taggant material and the binder are dissolved in the solvent.

* * * * *